US007010710B2

United States Patent
Piazza

(10) Patent No.: US 7,010,710 B2
(45) Date of Patent: Mar. 7, 2006

(54) PROXIMITY SENSOR ENHANCED POWER MANAGEMENT

(75) Inventor: William Joseph Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 721 days.

(21) Appl. No.: 10/063,008

(22) Filed: Mar. 12, 2002

(65) Prior Publication Data

US 2003/0177402 A1 Sep. 18, 2003

(51) Int. Cl.
*G06F 1/30* (2006.01)

(52) U.S. Cl. ..................................................... 713/323
(58) Field of Classification Search ................. 702/150; 713/323, 324, 200
See application file for complete search history.

(56) References Cited

U.S. PATENT DOCUMENTS

| | | | |
|---|---|---|---|
| 5,317,304 A | 5/1994 | Choi | 340/571 |
| 5,675,321 A | 10/1997 | McBride | 340/568 |
| 6,133,830 A | 10/2000 | D'Angelo et al. | 340/571 |
| 6,134,584 A | 10/2000 | Chang et al. | 709/219 |
| 6,374,145 B1 * | 4/2002 | Lignoul | 700/17 |
| 6,374,277 B1 * | 4/2002 | Vong et al. | 708/112 |
| 6,418,536 B1 * | 7/2002 | Park | 713/323 |
| 6,601,012 B1 * | 7/2003 | Horvitz et al. | 702/150 |
| 6,665,805 B1 * | 12/2003 | Tsirkel et al. | 713/323 |
| 6,669,650 B1 * | 12/2003 | Anker et al. | 600/551 |

OTHER PUBLICATIONS

Eric J. Horvitz Appl. No. 09/881,502.*

* cited by examiner

*Primary Examiner*—Thomas C. Lee
*Assistant Examiner*—Vincent Tran
(74) *Attorney, Agent, or Firm*—Richard F. Frankeny; Winstead Sechrest & Minick P.C.; Martin McKinley

(57) ABSTRACT

A computing device incorporates a user sensor to signal when a user is moving or within a specified proximity of the computing device. If the user is not present, the computing device will go into a low-power mode. A real-time clock is programmed to interrupt at user indicted event times and dates. If a queued event occurs, the computing device samples the user sensor and begins notification procedures if the user is present. If a queued event time occurs while the user is not present, then the computing device enters or stays in the low-power mode. If the user sensor indicates that the user is present, the computing device notifies the user of the pending event and any missed events. The computing device may require a user code before normal operation is activated following a transition to an indication that the user is present.

22 Claims, 2 Drawing Sheets

PROXIMITY SENSOR ENHANCED POWER MANAGEMENT

TECHNICAL FIELD

The present invention relates in general to methods and apparatus for signaling a computing device when to automatically activate and de-activate power saving operations.

BACKGROUND INFORMATION

The class of computers known as personal digital assistants (PDAS) and laptops are well known in the industry. These types of computer systems are portable, battery operated and may include date-book application programs used to remind their user about meetings, events, appointments, errands, etc. An example of a portable computing device to which the present invention applies is a Palm Pilot, manufactured by Palm, Inc. of Santa Clara, Calif.

Many standard personal computers (PCs) and battery operated computing devices typically go into a low-power consumption sleep mode when there is no user activity. Throughout this disclosure, these computers will be referred to as computing devices whether they are line powered PCs, battery operated laptops, palmtops or a PDA. Power saving strategies may be different in battery operated devices as opposed to line operated computing devices, but both have the goal of reducing energy consumption.

If date-book programs are in use in a computing device, it may be awakened from the low-power state at times programmed into its hardware clock circuit at which time notification procedures may be initiated to remind the user of a pending current date-book event. To remind the user of a pending date-book event, the computing device may display messages on an LCD screen, create sounds using audio circuits within the computing device, cause vibration by activating a motor with an off-center weight attached, or a combination of these techniques may be used. If the user responds to the notification procedure (alarm) (for example, by clearing a message from the display screen), then the computing device may queue the time of the next event into the clock circuit and return to the low-power state. However, if the user is not near the computing device when the alarm goes off, the appointment may be missed.

Computing devices such as PDAs typically program a notification alarm (alarm) to repetitively re-activate after a predetermined time interval (e.g., in another five minutes) and then go into the low power state. After some number of repetitions of activating the alarm (for example, after five attempts to remind the user), the computing device may stop presenting the alarm (in the interest of preserving batteries) until another program event, other than the missed event, becomes current.

The sub-systems required and actions taken during these notification procedures may require considerable energy for a battery operated device. Operating the back-light of an LCD display, running a motor and playing audio through a speaker are some of the most power consuming operations that a computing device performs. Therefore, in cases where the user may be away from the computing device for an extended period of time, the computing device will waste electrical energy by repeatedly attempting to remind the user of a pending event. In addition, the user may not see the reminder until the next time he activates the computing device for some unrelated purpose or until it is time for the next sequential event, both of which may be days later.

There is, therefore, a need for a method and apparatus which enables a computing device to conserve energy with event notification procedures when no user is present to receive the notification.

SUMMARY OF INVENTION

The present invention utilizes a user sensor which generates a position signal when a user is within a specified proximity of a computing device or is actually handling the computing device. If a user leaves the proximity of the computing device or if there is a prolonged period of user inactivity, the computing device goes into a low-power operation mode using standard methods or in response to the position signal indicating the user not present. If the user has stored the times and dates of events for which the user would like notification, these event times and dates are queued in a memory storage device. The queued events are compared to a real-time and date clock (real-time clock) to determine when a queued event time has arrived. A user that is present will be notified that the event time has occurred by audio, vibration or other notification procedures. However, if the user is not present and a queued event time arrives, these notification procedures are not activated. Optionally, the notification procedures may be activated one time in hopes that the user is within a hearing range and not repeated if the first notification is not acknowledged. The next queued event time is then compared against the real-time clock. If the user returns and is again indicated present, then the computing device will notify the user of the pending event and any missed events. The computing device may require the user to enter a user code before complete normal operation is activated following a cycle of the user sensor (user indicated present and then not present). The present invention improves upon previous proximity sensor operated power saving devices by controlling when and how a computing device returns to normal operation following a low-power mode. The procedures which the clock circuitry of the computing device uses to try to notify a user of a pending queued event are improved by embodiments of the present invention. The high-power consumption modes of notification are suspended or invoked less frequently unless there is a user within a positional signal indicated proximity to observe the notification procedures.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF DRAWINGS

For a more complete understanding of the present invention, and the advantages thereof, reference is now made to the following descriptions taken in conjunction with the accompanying drawings, in which.

DETAILED DESCRIPTION

Figure 1:
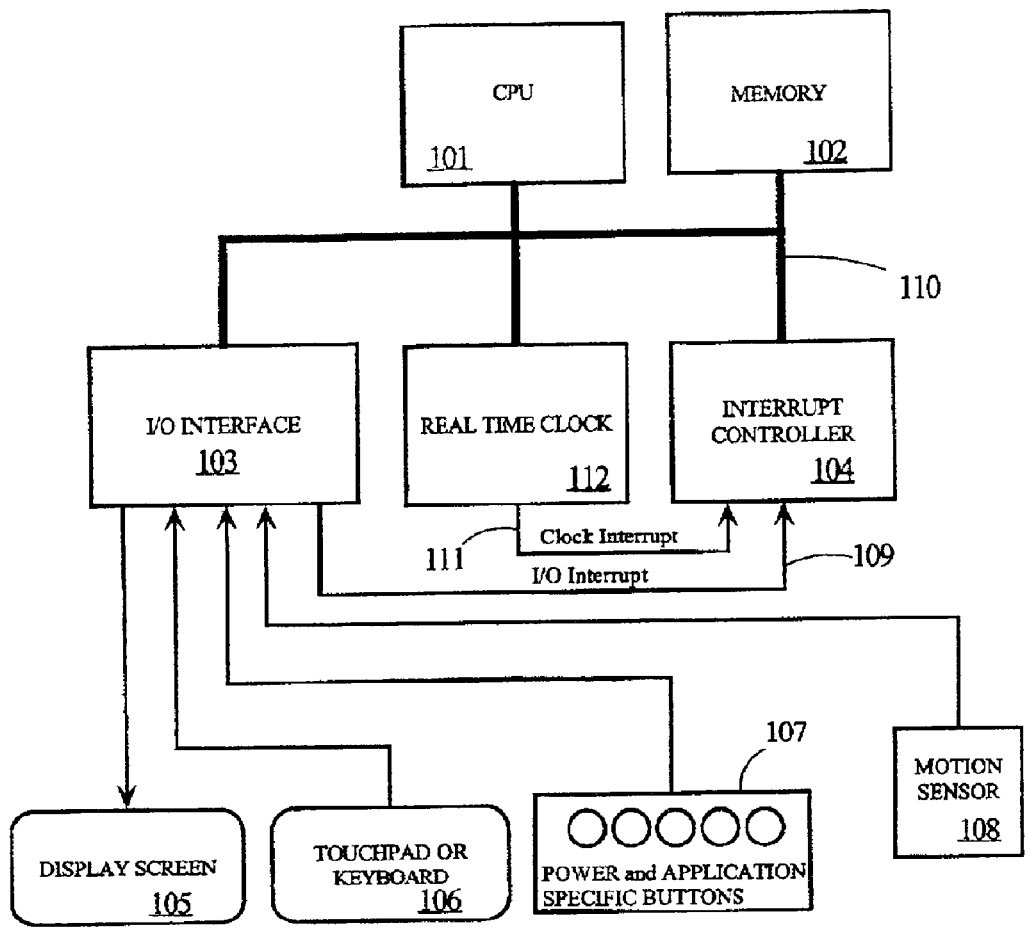
FIG. 1 is a block diagram of system components of a computing device using a proximity or motion sensor according to embodiments of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates the major functional blocks of a computing device (in this case a PDA) wherein a motion sensor 108 is incorporated. Motion sensor 108 may comprise a simple set of electrical contacts that "make contact" whenever the computing device is moved in any direction. Other, more sophisticated implementations of motion sensor 108 may use proximity devices which provide an output signal in the presence of a user. In FIG. 1, a Central Processing Unit (CPU) 101 is connected over a system bus 110 to a number of subsystems, among them are memory 102, I/O 103, interrupt controller 104 and a real-time and date clock (real-time clock) 112. Memory 102 includes the non-volatile memory that functions to hold both programs that are executed by the computing device and data (such as datebook entries) entered by the user. The I/O subsystem 103 provides a means for connecting various input and output components such as a display screen 105, touch pad or keyboard 106, application specific pushbuttons 107 and a motion or proximity sensor 108.

In normal use, the CPU 101 receives input from the user via the touch pad or keyboard 106 regarding the dates and times of the events for which the user wishes a reminder. The information regarding these events is stored in memory 102. A stored event program in memory 102 sorts through the list of events and queues the event for the first compare. The event program compares the current date and time from real-time clock 112 to the times of queued event times. When the time of the first queued event arrives, the CPU may display messages on display screen 105, activate audio circuits and/or vibration components (not shown).

If the first queued event is sufficiently far in the future, it may warrant the program controlling the computing device to reduce power consumption. In preparation, the CPU 101 programs a register in the real-time clock 112 to send an interrupt signal 111 to interrupt controller 104 when the time of the future event arrives. The CPU may then reduce power consumption using a number of techniques, such as reducing clock speed or executing a halt instruction to normally operating system programs.

When the time of the first queued event arrives, the real-time clock 112 sends the interrupt signal 111 to the interrupt controller 104 which causes the CPU 101 to resume normal execution. However, embodiments of the present invention sample the motion or proximity sensor 108 to determine if the user is present before notifying the user by visual, audible or tactile means. If the user does not respond, then the CPU 101 may determine that the device should go into low power again. This time, the CPU 101 programs registers in the I/O interface 103 to send an I/O interrupt 109 to interrupt controller 104 whenever the motion sensor 108 detects movement of the device. If the user is not present, the CPU 101 may program the real-time clock 112 with a new interrupt time for the near future and the computing device may re-enter the low-power state. Alternatively, the computing device may invoke the visual, audible or tactile notification procedures for only the first occurrence of an interrupt for a given event. CPU 101 may then set a flag in memory that prevents future interrupts for the same event from invoking the notification procedures.

Once CPU 101 re-enters the low-power state, the computing device may be awakened either by the presence of the user, as indicated by motion sensor 108, or by a real-time clock interrupt 111. If the computing device is awakened by the real-time clock interrupt 111, it first determines if the user is present before invoking notification procedures. In either of the cases, if the user is present, the computing device presents the first missed event and then may present subsequent queued events in order of their occurrences.

The same action is taken if motion sensor 108 senses actual motion of the computing device or motion indicating a user is in proximity of the computing device and no response to a reminder was obtained from the user. Alternatively, when a proximity sensor is used, the CPU 101 may program the real-time clock to repetitively interrupt at programmed short time intervals (e.g., every five minutes) and the computing device will re-enter the low-power consumption state. When the short interval has passed, the CPU 101 may be returned to the normal operational power mode when it samples the output of the proximity sensor 108 through the I/O subsystem 103 to determine if the computing device appears to be in the presence of the user. If it is determined that the user is not present, another short interval wait is programmed into the real-time clock and the computing devices return to the low-power consumption state without having activated high-power consuming devices. On the other hand, if the proximity sensor indicates that the user is present, the computing device attempts to remind the user of the events as is currently done. If the user is present but does not respond, the computing device may go back to the low-power state.

Electrical devices capable of sensing motion, acceleration or proximity are well known within the industry. In its simplest form, a motion sensor 108 may be a mercury switch (wherein a pool of liquid mercury shorts across two electrical contacts when the switches moved to a certain angle, likewise, any making or breaking of contacts would be indicative of a motion). Because of health hazards associated with liquid mercury, this type of device is rarely used. However, other types of sensors exist that provide an electrical output based upon the inertial effects, sensing a change in IR light reaching the computing device, changes in capacitance around a computing device and so on.

Figure 2:
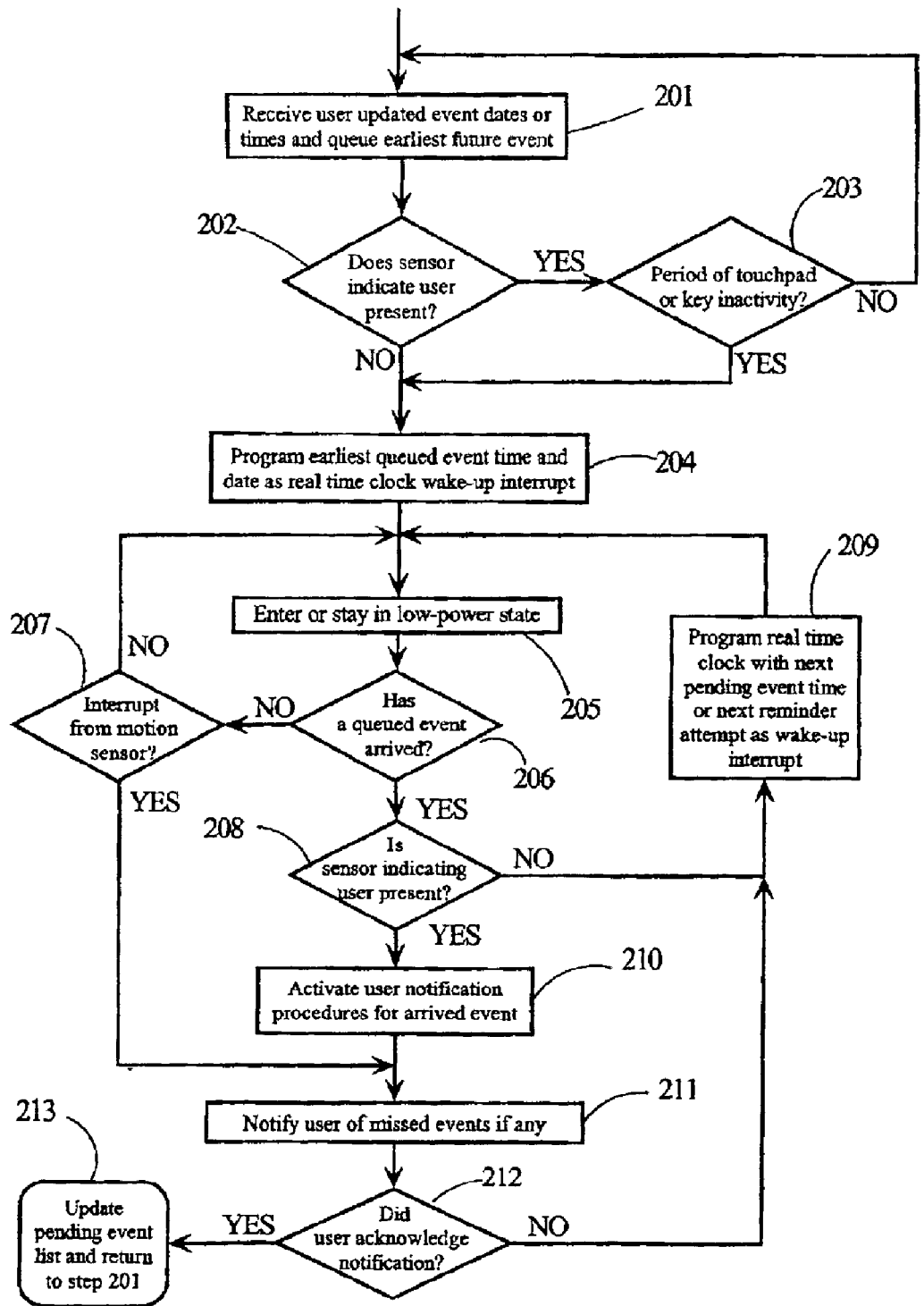
FIG. 2 is a flow diagram of method steps used in embodiments of the present invention.

FIG. 2 is a flow chart of method steps according to embodiments of the present invention. In step 201, the CPU 101 of a computing device 100 receives user updated event times and dates for which a user desires notification and queues the earliest future event for setting an interrupt from real-time clock 112. In step 202, a test is done to determine if the motion sensor 108 indicates that the user is present. If the result of the test in step 202 is YES, then normal operation is continued in step 203 where a test is done to determine if there has been a predetermined period of user inactivity. If the result of the test in step 203 is NO, then a return is taken to step 201 waiting for motion sensor 108 to indicate that the user is not present. If the result of the test in step 202 is NO, then in step 204 the earliest queued event time and date are programmed to generate a real-time clock 112 interrupt. In step 205, the computing device 100 goes into or stays in the low-power mode. In step 206, a test is done to determine if a queued event time has arrived. If the result of the test in step 206 is NO, then in step 207 a test is done to determine if a motion sensor based interrupt has been received. This would indicate that the user has returned prior to the particular queued event time. If the result of the test in step 207 is NO, then a branch is taken back to step 205. If the result of the test in step 207 is YES, then a branch is taken to step 211 where the user may be notified of any missed events. If the result of the test in step 206 is YES, then in step 208 a test done to determine if motion sensor 108 indicates that the user is present. If the result of the test in step 208 is NO, then in step 209 the real-time clock 112 is programmed to interrupt at the next pending event time or at a next reminder time. A return is then taken to step 205 where the computing device 100 either enters or stays in the low-power state. If the result of the test in step 208 is YES, then in step 210 the user notification procedures are activated for the current arrived event time. The user is also notified of any missed event(s) in step 211. In step 212, a test is done to determine if the user acknowledged the event notifications. If the result of the test in step 212 is NO, then step 209 is executed. If the result of the test in step 212 is YES, then in step 213 the pending event list is updated by removing the acknowledged events from the event list and a return is taken back to step 201.

Although the present invention and its advantages have been described in detail, it should be understood that various changes, substitutions and alterations can be made herein without departing from the spirit and scope of the present invention as defined by the appended claims.

What is claimed is:

1. A method for managing power in a computing device comprising the steps of:
   storing an event time and date for which a user desires notification;
   generating an event interrupt on a compare of said event time and date to a real-time and date clock;
   sampling a user present sensor in response to said event interrupt to determine if the user is present, said user present sensor generating a user present signal having a first state if said user is present and a second state if said user is not present;
   activating a user event notification process in response to said first state of said user present signal following said event interrupt;
   activating said user event notification process to occur one time in response to said second state of said user present signal following said event interrupt;
   returning said computing device to a low-power mode following said event notification process if said user does not acknowledge said user event notification process; and
   disabling said user event notification process until said first state of said user present signal occurs.

2. The method of claim 1 further comprising the steps of:
   programming a clock interrupt to occur at a period of time after said event time and date in response to said second state of said user present signal following said event interrupt;
   returning said computing device to a low-power mode; and
   reactivating said user event notification process in response to said first state of said user present signal following said programmed clock interrupt.

3. The method of claim 1 further comprising the step of:
   returning said computing device to a low-power mode if said user does not acknowledge said user event notification process.

4. The method of claim 1 further comprising the step of:
   requiring a user verification code to be entered to said computing device before full access to said computing device is granted whenever said user present signal cycles from said second state to said first state.

5. The method of claim 1, wherein said computing device is set to a low-power mode in response to said second state of said user present sensor or an indication said computing device has undergone a predetermined period of inactivity.

6. The method of claim 1, wherein said computing device is a battery operated palmtop personal computer or personal digital assistant.

7. The method of claim 1, wherein said user present sensor is a proximity sensor that generates said first state of said user present signal when said user is within a predetermined distance from said computing device.

8. The method of claim 1, wherein said user present sensor is a motion sensor that generates said first state of said user present signal when said user is moving within a proximity of said computing device.

9. The method of claim 1, wherein said user present sensor is a motion sensor that generates said first state of said user present signal when said user is physically moving said computing device.

10. A computing device comprising:
    a central processing unit (CPU);
    random access memory (RAM);
    an I/O interface coupled to an I/O device;
    a real-time and date clock (real-time clock);
    an interrupt controller;
    a bus system coupling said CPU, said RAM, said I/O interface, said real-time clock and said interrupt controller;
    a user sensor generating a user present signal having a first state when said user is present and a second state when said user is not present;
    circuitry for storing an event time and date for which a user desires notification;
    circuitry for generating an event interrupt on a compare of said event time and date to said real-time and date clock;
    circuitry for activating user event notification process in response to said first state of said user present signal following said event interrupt;
    circuitry for sampling said user present signal in response to said event interrupt to determine if said user is present;
    circuitry for activating said event notification process to occur one time in response to said second state of said user present signal following said event interrupt;
    circuitry for returning said computing device to a low-power mode following said event notification process if said user does not acknowledge said event notification process; and
    circuitry for disabling said event notification process until said first state of said user present signal occurs.

11. The computing device of claim 10 further comprising:
    circuitry for programming a time for a clock interrupt in response to said second state of said user present signal following said event interrupt;
    circuitry for returning said computing device to a low-power mode; and
    circuitry for reactivating said user event notification process in response to said first state of said user present signal following said programmed clock interrupt.

12. The computing device of claim 10 further comprising:
returning said computing device to a low-power mode if said user does not acknowledge said event notification process.

13. The computing device of claim 10 further comprising:
requiring a user verification code to be entered to said computing device before full access to said computing device is granted whenever said user present signal cycles from said second state to said first state.

14. The computing device of claim 10, wherein said computing device is set to a low-power mode in response to said second state of said user present sensor or an indication said computing device has undergone a predetermined period of inactivity.

15. The computing device of claim 10, wherein said computing device is a battery operated palmtop personal computer or personal digital assistant.

16. The computing device of claim 10, wherein said user present sensor is a proximity sensor that generates said first state of said user present signal when said user is within a predetermined distance from said computing device.

17. The computing device of claim 10, wherein said user present sensor is a motion sensor that generates said first state of said user present signal when said user is moving within a proximity of said computing device.

18. The computing device of claim 10, wherein said user present sensor is a motion sensor that generates said first state of said user present signal when said user is physically moving said computing device.

19. A method for managing power in an electronic device comprising the steps of:
generating a user present signal from a sensor in said electronic device, said user present signal having a first state when said user is present and a second state when said user is not present;
generating a device activity signal within said electronic device, said device activity signal having a first state when said electronic device is being used and a second state when said electronic device undergoes a predetermined period of not being used;
suspending high power operations of said electronic device in response to said second state of said user present signal or said second state of said device activity signal; and
activating selected high power operations of said electronic device in response to a clock interrupt occurring at a programmed clock time, an event interrupt occurring on a compare of a programmed event time and date to a real-time and date clock, and said user present signal.

20. The method of claim 19, wherein said selected high power operations comprise event notification process of audio, video or tactile responses from said electronic device for said user.

21. The method of claim 19 further comprising the steps of:
activating said selected high power operations following said clock interrupt if said user present signal is at said first state indicating said user is present; and
maintaining said suspension of said high power operations if said user present signal is at said second state.

22. The method of claim 19 further comprising the steps of:
activating said selected high power operations following said event interrupt if said user present signal is at said first state indicating said user is present;
activating said high power operations if said user acknowledges an occurrence of said selected high power operations; and
maintaining said suspension of said high power operations if said user does not acknowledge said occurrence of said selected high power operations.

* * * * *